Patented Feb. 17, 1942

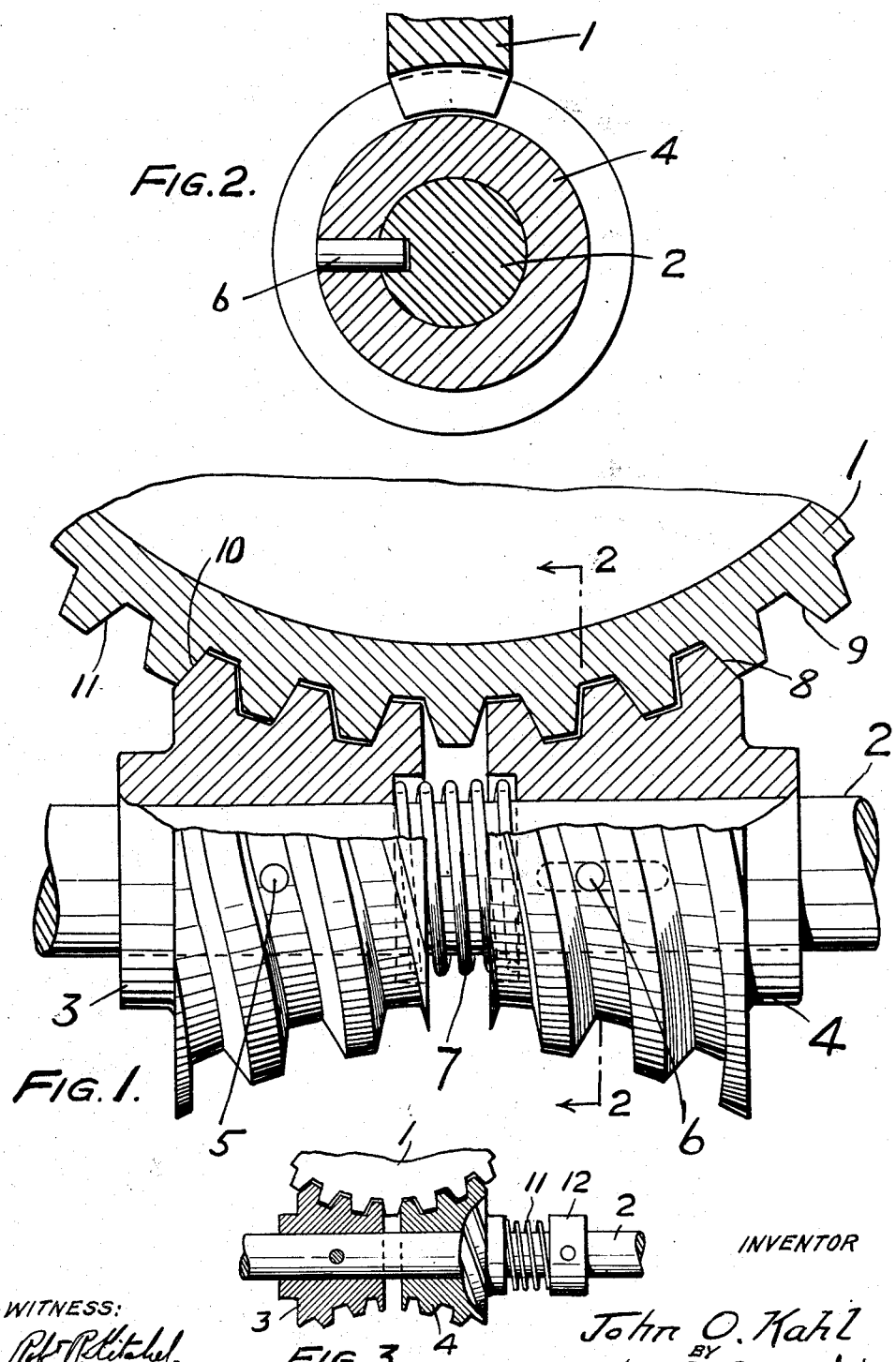

2,273,784

UNITED STATES PATENT OFFICE 2,273,784

WORM GEARING

John O. Kahl, Philadelphia, Pa., assignor to Acme Gear & Machine Company, Philadelphia, Pa., a corporation of Pennsylvania Application October 17, 1940, Serial No. 361,489

2 Claims. (Cl. 74—440)

The principal object of the present invention is to minimize or obviate loss motion or back lash when the direction of motion of worm gearing is reversed.

Other objects of the invention will appear from the following description at the end of which the invention will be claimed.

Generally stated, the invention comprises a worm wheel and a reversible worm shaft and a worm consisting of two conical parts disconnected in respect to each other and each of which is fast for rotation on and is rotatable with the shaft and one of which is additionally movable endwise of the shaft and a spring urging the two sections apart or together, one face of the thread of the non-slidable worm section bearing on one face of the teeth of the worm wheel, and the other face of the thread of the slidable worm section bearing on the other face of the teeth of the worm wheel.

The invention also comprises the improvements to be presently described and finally claimed.

In the following description reference will be made to the accompanying drawing in which:

Figure 1 is a diagrammatic view partly in section illustrating features of the invention;

Figure 2 is a sectional view taken on the line 2—2 of Figure 1, and

Figure 3 is a view illustrating a modification.

In the drawing, Figs. 1 and 2, 1 indicates a worm wheel and 2 indicates a worm shaft which in use is rotated in opposite directions. The worm consists of two conical sections 3 and 4. The section 3 is rotatable with the shaft 2 and is otherwise immovable in respect to the shaft. A pin 5 is shown for this purpose. The worm section 4 is rotatable with the shaft 2 but is provided with endwise movement in respect to the shaft 2. For this purpose a slot and pin or spline connection 6 is shown. A spiral spring 7 is shown interposed between the sections 3 and 4 of the worm and its function is to push the slidable worm section 4 toward the right in the drawing. In use and referring to the drawing, the right hand faces 8 of the tooth or thread of the worm section 4 are pressed by the spring 7 against the left hand faces 9 of the teeth of the wheel 1. The left hand faces 10 of the tooth or thread of the worm section 3 bear upon the left hand faces 11 of the worm wheel 1. The pin 6 is normally located intermediate of the ends of its slot and, therefore, does not interfere with the described action of the spring.

From the foregoing description it is evident that when the direction of revolution of the shaft 2 is changed there is no back lash or loss motion between the teeth of the worm wheel and the thread or tooth of the worm. The absence of loss motion or back lash is important; for example, where the gearing is employed to transmit movement into a dial or index, as in instrument work.

The construction and mode of operation of the modification shown in Figure 3 are as above described, except that the spring 11 bears on the outer side of the slidable section 4, and on a collar 12 secured to the shaft 2.

It will be obvious to those skilled in the art to which the invention relates that modifications may be made in details of construction and arrangement and in matters of mere form without departing from the spirit of the invention.

I claim:

1. In worm gearing a reversible worm shaft, a worm wheel, and a worm comprising two conical sections spaced apart disconnected in respect to each other and each independently and directly attached to the shaft for rotation therewith and whereof one section is additionally and normally movable endwise of the shaft, and a spring urging the movable section to slide in respect to the other section, whereby the thread on one section of the worm bears on one face of the teeth on the wheel and the thread on the opposite section of the worm bears on the opposite face of the teeth on the wheel.

2. In combination, a worm wheel, a reversible worm shaft, a worm in two sections disconnected in respect to each other and each of which is conical and engages with the teeth of the wheel, means fixedly connecting one section of the worm with the shaft, spline connection between the other section of the worm and the shaft, and a spring interposed between the sections of the worm, the spline connection being of sufficient length to allow the spring freedom of action, the elements of the spline connection being one on the shaft and the other on the section of the worm.

JOHN O. KAHL.